May 12, 1942.  C. MENDELSON  2,283,011
WASHING AND SCRUBBING APPARATUS
Filed Nov. 19, 1938  7 Sheets-Sheet 1
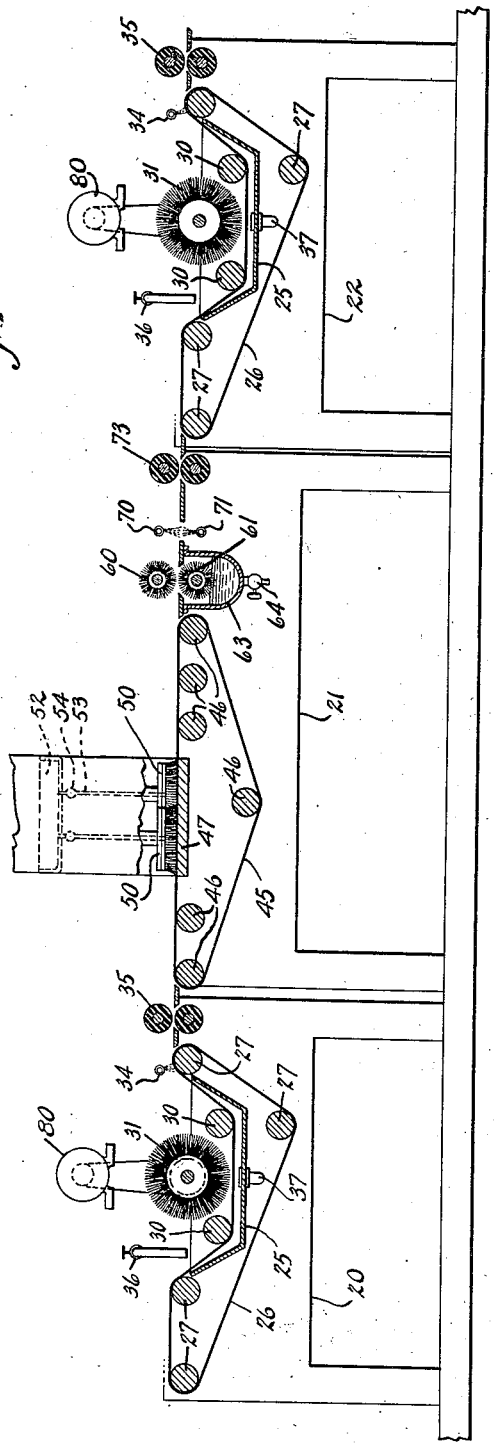
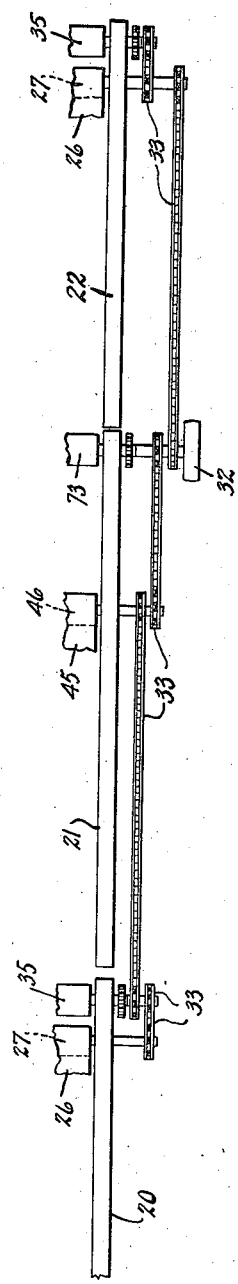
INVENTOR
CHARLES MENDELSON.
BY
ATTORNEY May 12, 1942.    C. MENDELSON    2,283,011
WASHING AND SCRUBBING APPARATUS
Filed Nov. 19, 1938    7 Sheets-Sheet 2

INVENTOR
CHARLES MENDELSON.
BY
ATTORNEY

May 12, 1942.  C. MENDELSON  2,283,011
WASHING AND SCRUBBING APPARATUS
Filed Nov. 19, 1938  7 Sheets-Sheet 3

INVENTOR
CHARLES MENDELSON.
BY
ATTORNEY

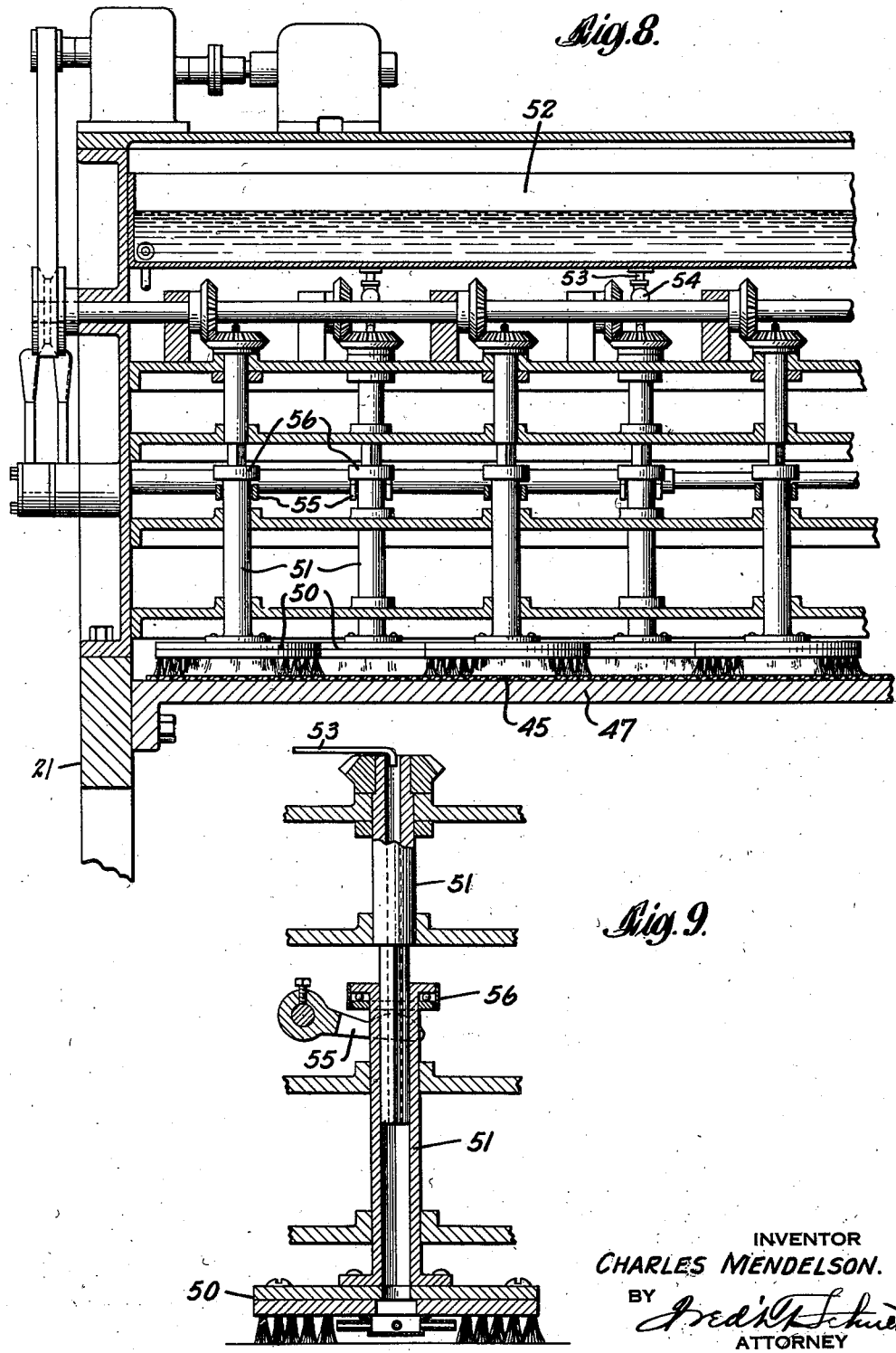

May 12, 1942.  C. MENDELSON  2,283,011
WASHING AND SCRUBBING APPARATUS
Filed Nov. 19, 1938  7 Sheets-Sheet 6

INVENTOR
CHARLES MENDELSON.
BY
ATTORNEY

May 12, 1942. C. MENDELSON 2,283,011
WASHING AND SCRUBBING APPARATUS
Filed Nov. 19, 1938 7 Sheets-Sheet 7

INVENTOR
CHARLES MENDELSON.
BY
ATTORNEY

Patented May 12, 1942

2,283,011

UNITED STATES PATENT OFFICE 2,283,011

WASHING AND SCRUBBING APPARATUS

Charles Mendelson, New Rochelle, N. Y.

Application November 19, 1938, Serial No. 241,316

1 Claim. (Cl. 15—85)

The invention relates to washing and scrubbing apparatus for cleansing goods, particularly goods of heavy material, for example carpets, rugs, blankets, and the like, and more especially in connection with goods having fringed ends.

The invention has for an object to provide mechanism for cleansing by a continuous process goods of the aforesaid nature, the various operations being conducted without necessitating any handling of the goods after they have once been introduced to the apparatus.

A further object of the invention is to provide means for effecting cleansing on both sides of the goods; and in the case of goods provided with end fringe, to comb out and further scrub this fringe after the goods have been scrubbed in the process of cleansing.

A still further object of the invention is to provide a novel assembly of independent units embodying washing and scrubbing elements, said units being so constructed that one or more of the units may be omitted under certain conditions.

Another object of the invention is to provide a novel washing unit and also a novel scrubbing unit.

In carrying out the invention, a plurality of units are arranged in succession to receive successively the goods to be cleansed, the first unit being generally in the nature of a washing unit designed to give the goods a preliminary treatment for cleansing the same of the more readily removable foreign matter. From this unit, the goods are transported mechanically to a further unit embodying a plurality of rotary scrubbing elements which effect the major cleansing operation. With this unit is associated also brushing means whereby opposite surfaces of the goods are further cleansed with a suitable cleaning liquid and, after leaving this brushing means, are thoroughly washed and freed of any of the cleansing liquid as by directing high-pressure sprays of clean water to the opposite sides of the goods. A further unit may receive the goods from the scrubbing unit to give the same a final cleansing to remove surplus soap or other cleansing matter, or to provide a bath of treating liquid.

The nature of the invention, however, will best be understood when described in connection with the accompanying drawings, in which:

Fig. 1 illustrates in longitudinal section, and more or less diagrammatically, the general arrangement of the novel unit assembly for effecting the cleansing of the goods.

Fig. 2 is a fragmentary plan of the driving mechanism for operating the different units.

Fig. 8 is a fragmentary transverse section, taken on the line 8—8, Fig. 7 of the drawings, and looking in the direction of the arrows.

Fig. 9 is a fragmentary longitudinal section, on an enlarged scale, taken on the line 9—9, Fig. 10 of the drawings.

Figure 3:
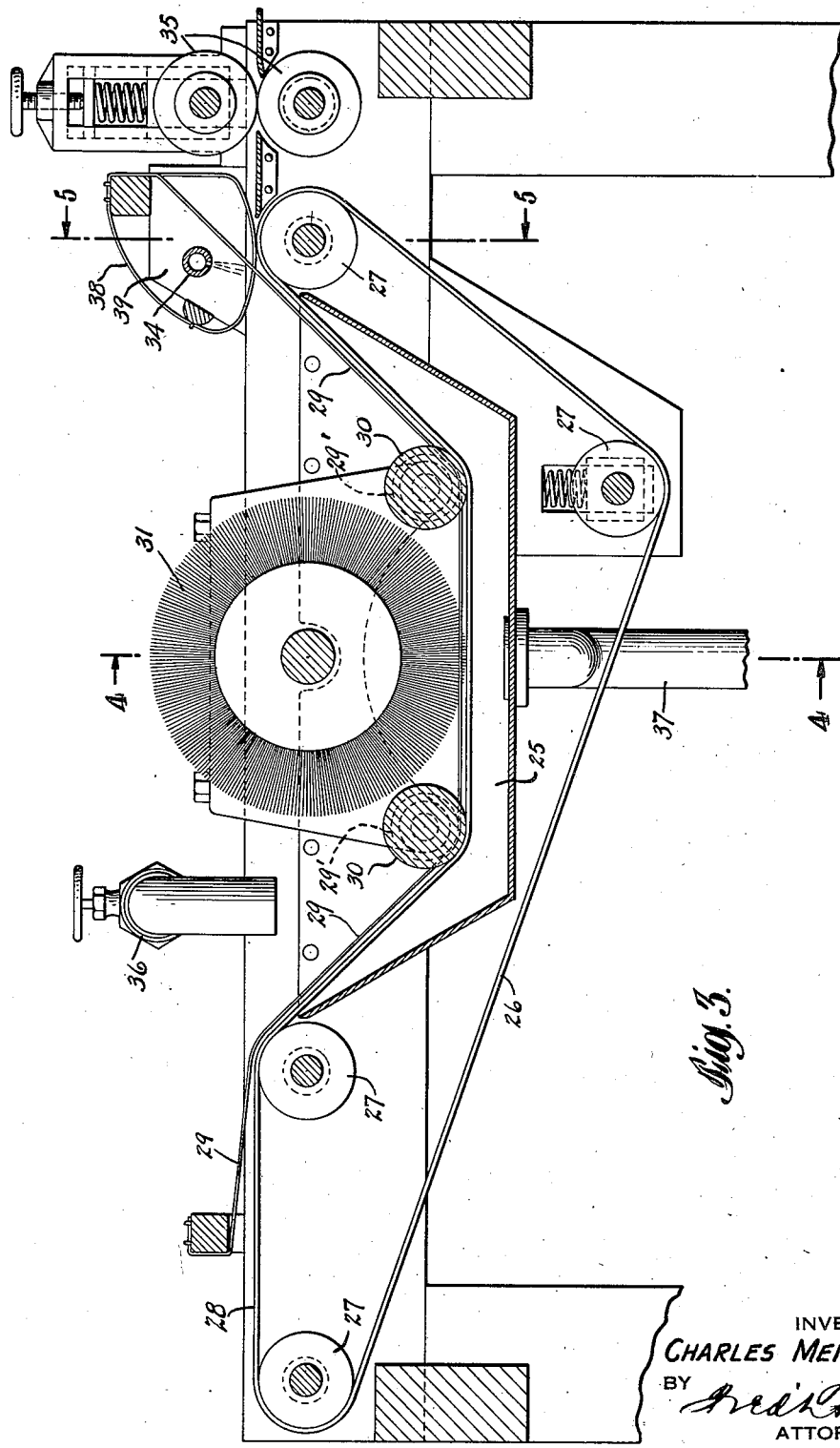
Fig. 3 is a detail longitudinal section of the initial washing unit.

Referring to the drawings, more especially Fig. 1 thereof, the novel apparatus is indicated as comprising three units arranged successively, the first unit 20 constituting a preliminary treatment or washing unit; the second unit 21, an intermediate or scrubbing and brushing unit; and the third unit 22, a final washing or treating unit. The end units are substantial duplicates and under certain conditions one or both may be omitted in the cleansing operation. The goods to be cleansed are generally first introduced to the unit 20 where they are given a preliminary treatment and washing to remove the more readily removable foreign matter therefrom. From this unit the goods are conveyed mechanically to the scrubbing unit 21 where the major cleansing operations are conducted; and from this unit the goods are further mechanically transported to the unit 22 for a final washing to remove surplus cleansing agent or for a liquid treatment of the goods.

Figure 4:
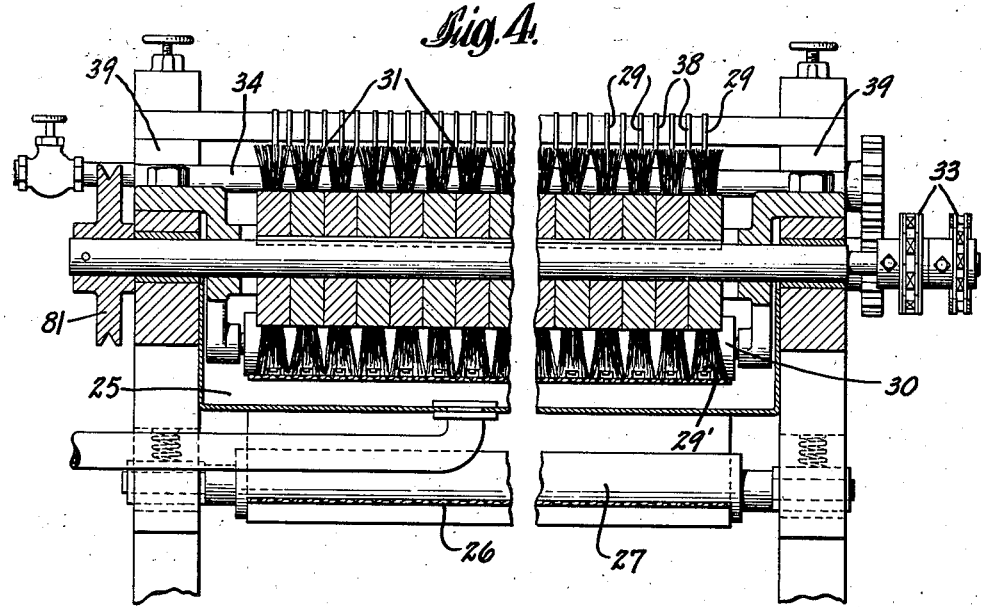
Fig. 4 is a transverse section thereof, taken on the line 4—4, Fig. 3 of the drawings, and looking in the direction of the arrows.
Figure 5:
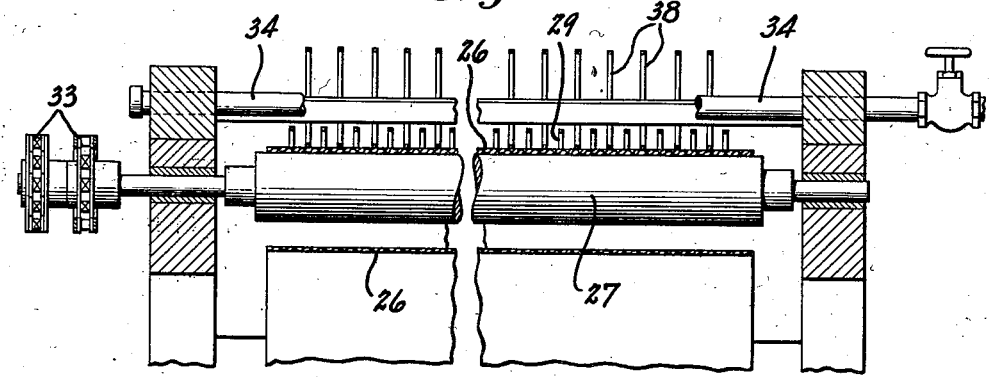
Fig. 5 is a similar section taken on the line 5—5 of Fig. 3, and looking in the direction of the arrows.

The end tanks, which are more particularly shown in Figs. 3-5, inclusive, comprise a suitable supporting framework on which is carried a tank 25 adapted to contain the requisite cleansing liquid, for example soap water or, in the case of the final unit, rinsing water or a treating solution. The goods are conducted mechanically therethrough as by means of an endless travelling belt 26 mounted over suitable rollers 27 supported in the framework. A flat entrance stretch 28 of this belt receives the goods and carries them into the tank under a plurality of guide strips or tapes 29 operating in grooves 29' of guide rollers 30 and prevent floating of the goods when immersed in the cleansing liquid of the tank.

The guide rollers 30 are located within the tank to present the goods to the action of a rotary brush 31 rotatably mounted in the framework, said brush and the other rotating mechanisms of the different units being driven, for example, from a motor 80 through a pulley 81, the belt being driven from a pulley 32 mounted conveniently in the frame for the unit 21, through intermediate mechanism including sprocket chains and sprockets 33, as is well understood and constituting no part of the present invention. In addition to the brushing action upon the goods afforded by brush 31, the goods leaving the tank may be subjected to a spray of clean water directed upon the upper surface thereof from the nozzle member 34; and, after leaving the tank and the spray nozzle, may be subjected to the action of a wringer 35. Liquid for the tank may be supplied from a faucet 36 associated with the unit and piped to a suitable source of supply (not shown); and to the bottom of the tank may be connected a suitable drain 37 for the removal of spent liquid.

Figure 6:
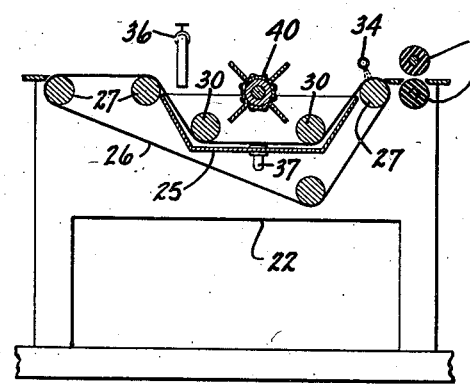
Fig. 6 is a fragmentary longitudinal section illustrating a modification in the washing unit.
Figure 7:
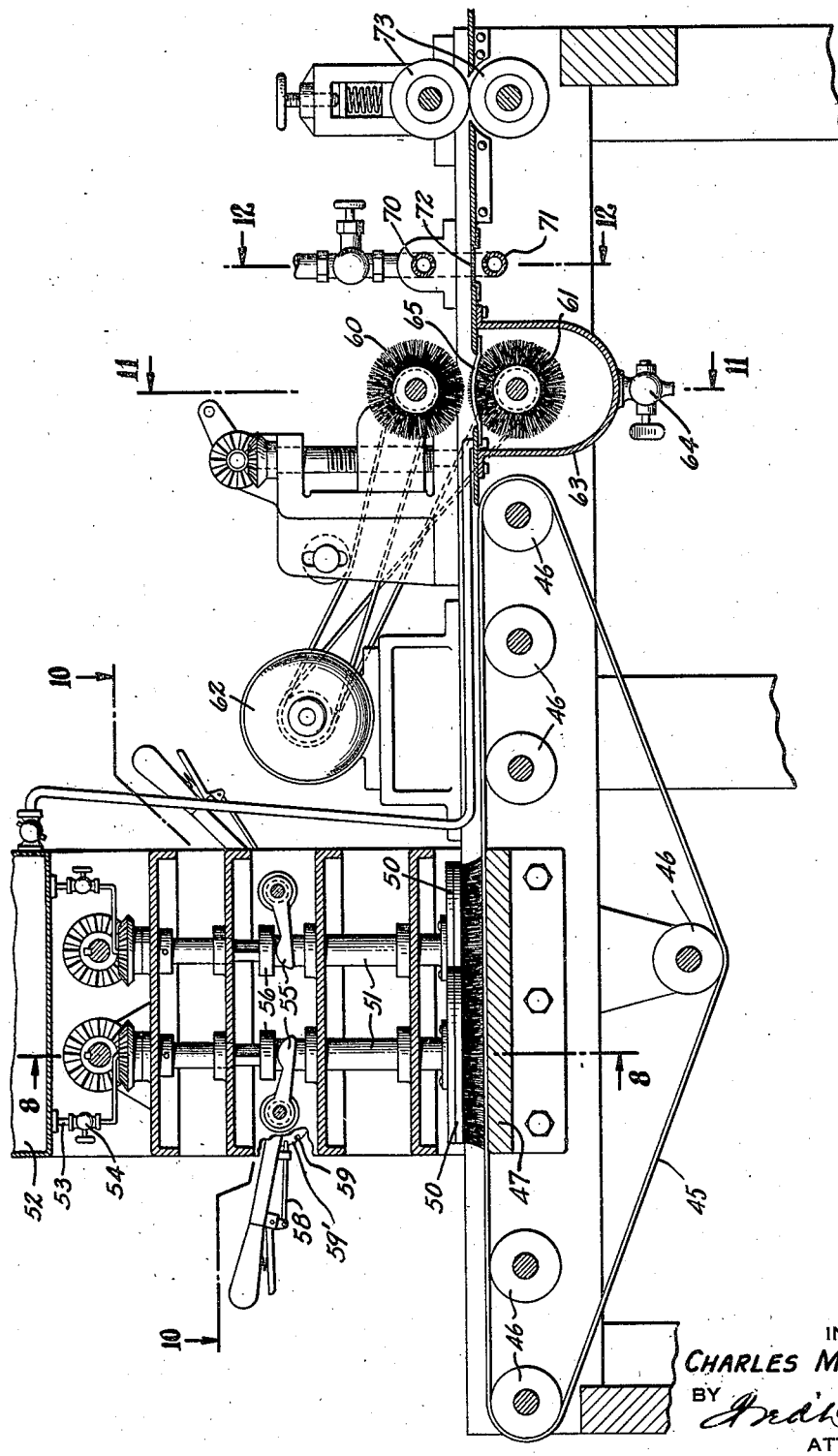
Fig. 7 is a longitudinal section through the scrubbing unit.
Figure 10:
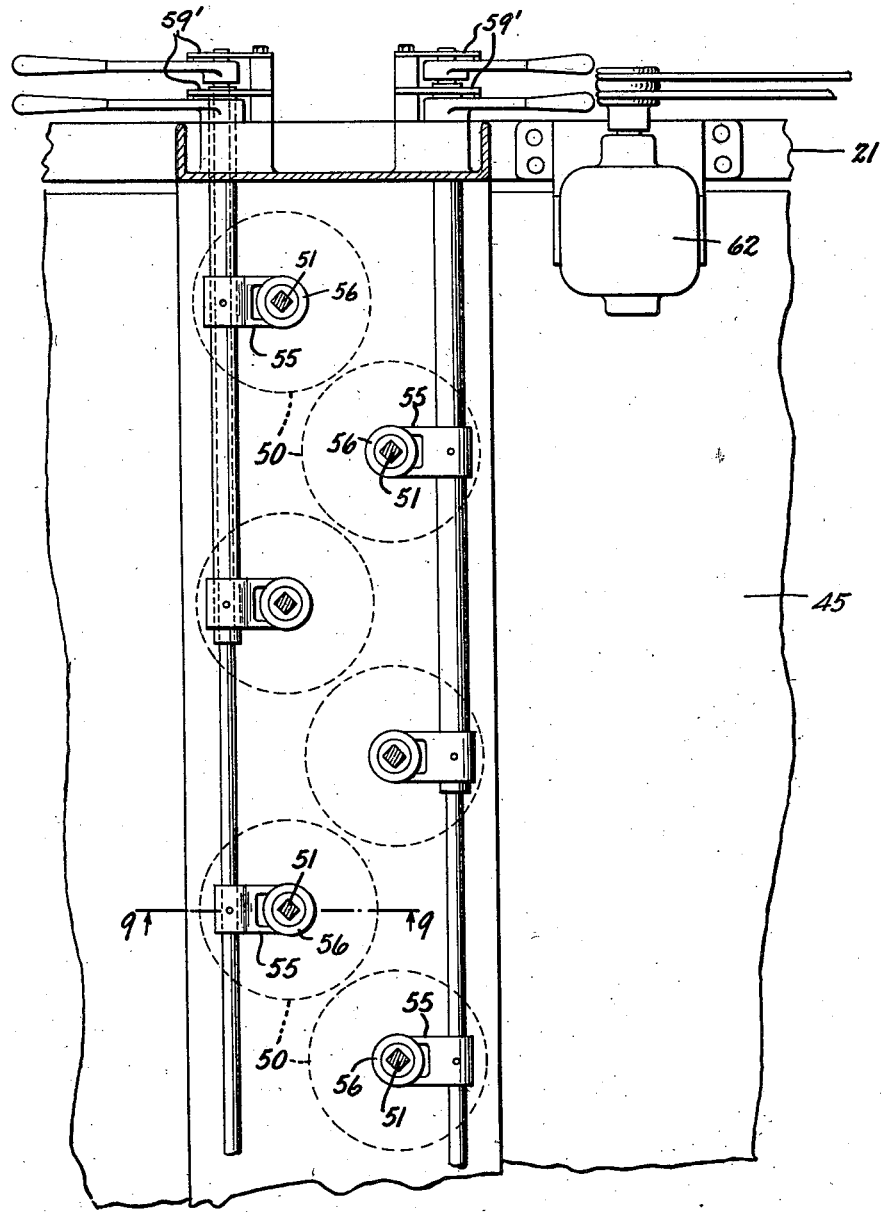
Fig. 10 is a fragmentary horizontal section, taken on the line 10—10, Fig. 7 of the drawings.
Figure 11:
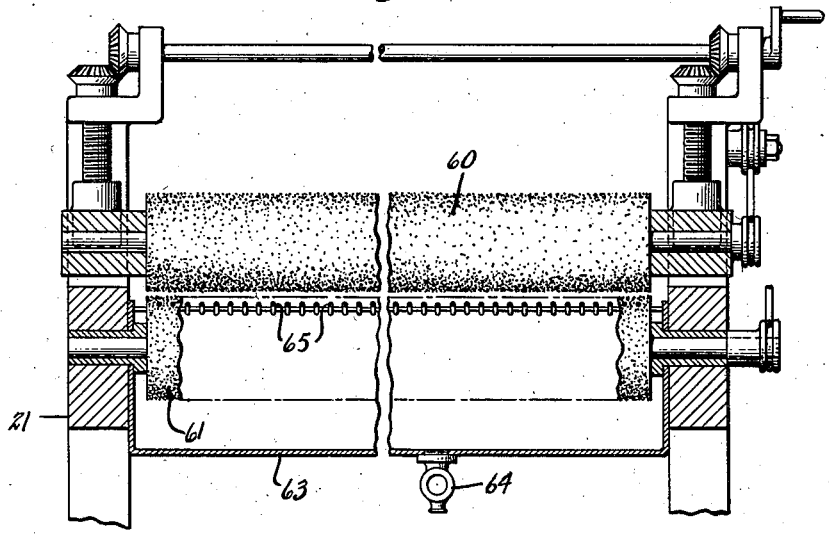
Fig. 11 is a transverse section, taken on the line 11—11, Fig. 7 of the drawings, and looking in the direction of the arrows.
Figure 12:
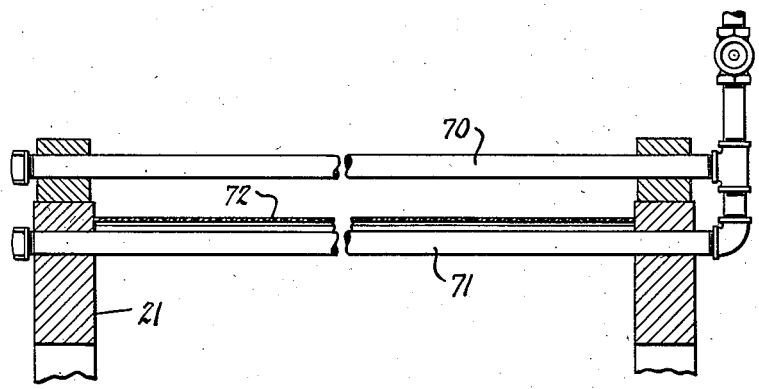
Fig. 12 is a similar view taken on the line 12—12, Fig. 7, and looking in the direction of the arrows.

It is preferred, also, to associate with the tank stripping means for the goods to separate the same from the tapes as they leave the tank. Such means may comprise a plurality of resilient metal ribbons or wires 38 carried by a block 39 secured to the frame, the ribbons bearing upon the periphery of the outgoing roller of the rollers 27, which, as indicated, is also the drive roll for the endless band. As hereinbefore noted, construction of the unit 22 is substantially identical with that of unit 20 just described. However, in the case of either or both units, there may be substituted for the brush 31 a paddle element 40 as indicated in Fig. 6 of the drawings, the action upon the goods being correspondingly modified.

After the goods have thus received a preliminary treatment whereby the more readily removable foreign matter has been separated therefrom, they are fed through the action of the endless belt 26 and wringer means 35 beyond the latter to the unit 21 where the major cleansing operations are conducted. This unit, reference being had more particularly to Figs. 7 to 12 of the drawings, comprises similarly an endless travelling belt 45 operating over guide rollers 46, one of which constitutes a driving roll for the tape, said belt being designed to receive the goods from the previous unit and conduct them over a table portion 47 rigidly secured to the frame of the unit. On this table, as the goods pass thereover, they are designed to be subjected to a scrubbing action over the upper surface. This operation may be effected by rotary scrubbing elements which may rotate about an axis parallel to or, preferably, perpendicular to, said table.

For example, as indicated in the drawings, a plurality of horizontally disposed brush elements 50 are mounted above the table 47 and are designed to be driven by vertically disposed shafts 51 to rotate said brushes in a plane parallel to the top of said table. Provision is made whereby the brushes with portion of the driving mechanism, preferably weighted, may have a limited downward movement under the action of gravity to insure thereby proper contact with the surface of the goods and an active cleansing action thereon. Provision is further made for introducing to the individual brushes a suitable cleansing liquid which is supplied from a storage tank 52 located above the driving mechanism for the brushes and introduced into hollow telescoping shaft portions thereof, as through a pipe 53 connected with the said tank and including an intermediate shut-off valve 54.

As hereinbefore noted, the driving shaft portions are made telescoping in order that the brushes may be lifted above the table to accommodate various thicknesses of goods passing thereover for the scrubbing operation by the brushes. To this end, a bifurcated lever member 55 operates against a collar 56 on the lowermost section of the telescoping shaft. The position of the shaft is determined by locking means 58 for the outer or handle portion of the bifurcated lever designed to fit suitable notches 59 of a stop segment 59'. By this expedient, the proper separation of the brushes above the table may readily be secured for the particular goods under treatment, and these are given a thorough scrubbing as they pass over the said table.

Beyond the scrubbing mechanism hereinbefore described is a further cleansing mechanism or brushing device which not only brushes the surface previously subjected to the scrubbing action but operates also on the under side of the goods. This brushing device comprises a pair of juxtaposed brushes 60 and 61 located in the path of the outwardly moving goods and driven from a motor or like device 62 which is reversible for the purpose hereinafter set forth. The lower of these brushes, moreover, dips into a container 63 for a suitable cleansing liquid such as soap water so that it will supply to the goods, especially on the under side thereof, an additional cleansing liquid. A drain 64 is provided for clearing the receptacle 63 of the liquid.

As in many instances the goods to be cleaned, such as rugs and the like, are provided with end fringes, there is interposed between the said brushes 60 and 61 a foraminous member or screen 65 over which the goods must travel, but having apertures sufficiently large to render the brush action on the goods effective. Fringe and like loose material will therefore be prevented from dropping into the container 63 or doubling up in an objectionable manner; and, furthermore, the fringe will be combed out by the rotating brushes acting thereon over the foraminous member. This, of course, applies only to the advancing edge of the goods with the brushes rotating in the normal direction; but, in accordance with the invention, motor 62 being of the reversible type, when the trailing edge of the goods arrives between the brushes the direction of rotation of the said brushes is reversed temporarily by changing the direction of said motor, as is well understood.

After the goods have cleared said brushing device, they may be subjected on opposite sides to a high-pressure water spray as from nozzles 70 and 71 located on opposite sides of a foraminous member or screen 72 over which the goods pass. The moisture is then wrung out from the goods by a wringer 73 at the end of the unit; and from which the goods may be delivered to a further washing and/or treating action as to the unit 22 which operates substantially as the unit 20 hereinbefore described.

I claim:

In washing and scrubbing apparatus of the nature set forth: a unit comprising a moving carrier for the goods to be cleansed, a brushing device to which the goods are presented by the carrier and comprising a pair of coacting rotary brushes through which the goods are passed and engaging the opposite surfaces thereof for cleansing and advancing the goods, means to receive and convey the goods therefrom, a foraminous element interposed between the said brushes, a tank for cleansing liquid located beneath the under brush and into which it dips, and reversible means for rotating the brushes.

CHARLES MENDELSON.